(12) United States Patent
Rihan et al.

(10) Patent No.: US 8,015,388 B1
(45) Date of Patent: Sep. 6, 2011

(54) BYPASSING GUEST PAGE TABLE WALK FOR SHADOW PAGE TABLE ENTRIES NOT PRESENT IN GUEST PAGE TABLE

(75) Inventors: Sahil Rihan, Mountain View, CA (US); Pratap Subrahmanyam, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 515 days.

(21) Appl. No.: 11/499,125

(22) Filed: Aug. 4, 2006

(51) Int. Cl.
*G06F 12/00* (2006.01)
(52) U.S. Cl. .................. 711/206; 711/203; 711/E12.058
(58) Field of Classification Search .................. None
See application file for complete search history.

(56) References Cited

U.S. PATENT DOCUMENTS
2006/0259734 A1* 11/2006 Sheu et al. .................. 711/203
* cited by examiner

*Primary Examiner* — Reginald G Bragdon
*Assistant Examiner* — Thanh D Vo (57) ABSTRACT

A method and system are provided that does not perform a page walk on the guest page tables if the shadow page table entry corresponding to the guest virtual address for accessing the virtual memory indicates that a corresponding mapping from the guest virtual address to a guest physical address is not present in the guest page tables. A marker or indicator is stored in the shadow page table entries to indicate that a mapping corresponding to the guest virtual address of the shadow page table entry is not present in the guest page table.

30 Claims, 7 Drawing Sheets

BYPASSING GUEST PAGE TABLE WALK FOR SHADOW PAGE TABLE ENTRIES NOT PRESENT IN GUEST PAGE TABLE

BACKGROUND OF THE INVENTION

1. Field of the Invention

This invention relates generally to computer virtualization and, in particular, to a method and system for identifying and marking certain shadow page table entries that do not have corresponding mappings in the guest page table of a virtualized computer system for bypassing the guest page walk for those shadow page table entries.

2. Description of the Related Art

The advantages of virtual machine technology have become widely recognized.

Among these advantages is the ability to run multiple virtual machines on a single host platform. This makes better use of the capacity of the hardware, while still ensuring that each user enjoys the features of a "complete" computer. Depending on how it is implemented, virtualization can also provide greater security, since the virtualization can isolate potentially unstable or unsafe software so that it cannot adversely affect the hardware state or system files required for running the physical (as opposed to virtual) hardware.

Figure 1:
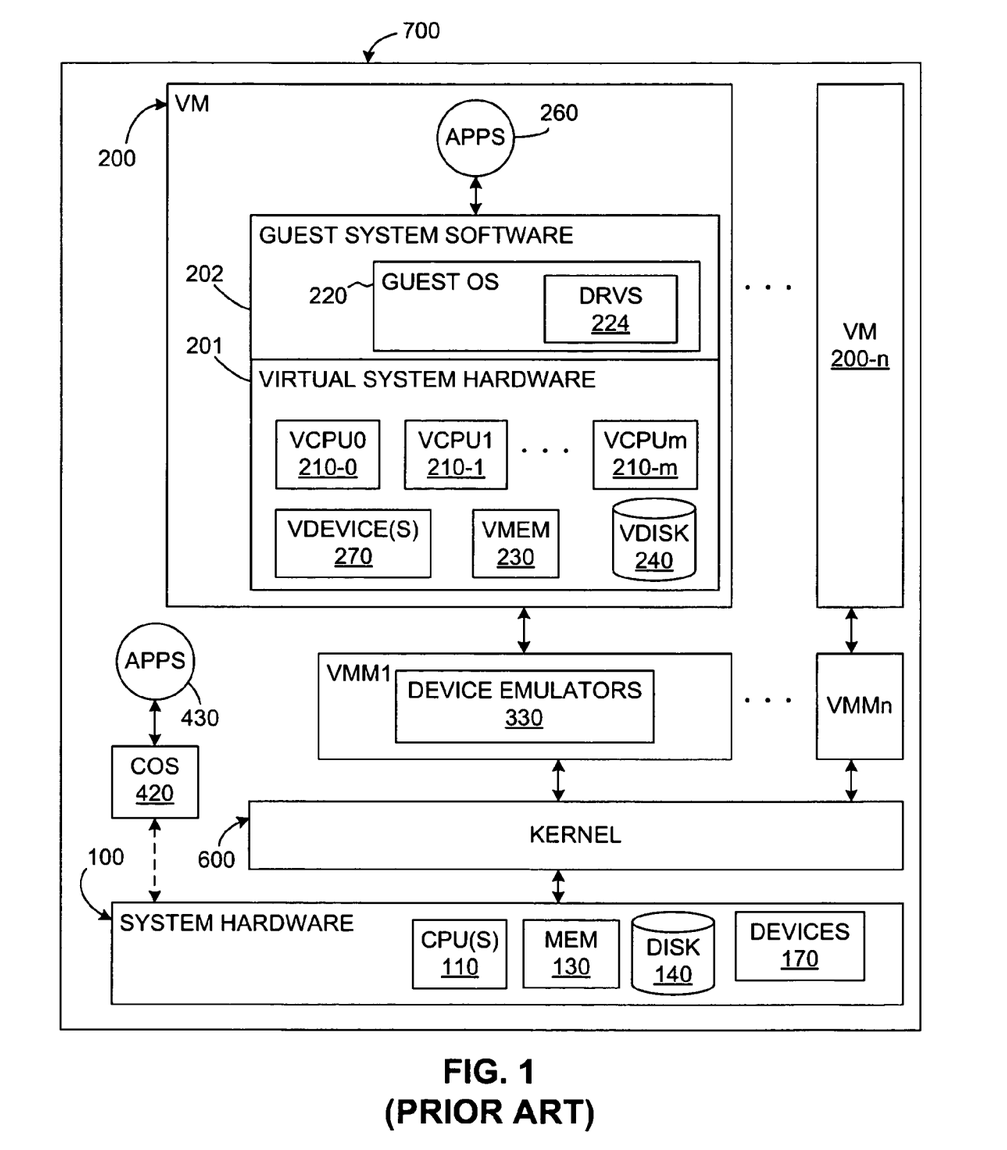
FIG. 1 illustrates a non-hosted virtualized system.

As is well known in the field of computer science, a virtual machine (VM) is an abstraction—a "virtualization"—of an actual physical computer system. FIG. 1 shows one possible arrangement of a computer system 700 that implements virtualization. A virtual machine (VM) or "guest" 200 is installed on a "host platform," or simply "host," which will include system hardware, that is, a hardware platform 100, and one or more layers or co-resident components comprising system-level software, such as an operating system or similar kernel, or a virtual machine monitor or hypervisor (see below), or some combination of these. The system hardware typically includes one or more processors 110, memory 130, some form of mass storage 140, and various other devices 170.

Each VM 200 will typically have both virtual system hardware 201 and guest system software 202. The virtual system hardware typically includes at least one virtual CPU, virtual memory 230, at least one virtual disk 240, and one or more virtual devices 270. Note that a disk—virtual or physical—is also a "device," but is usually considered separately because of the important role of the disk. All of the virtual hardware components of the VM may be implemented in software using known techniques to emulate the corresponding physical components. The guest system software includes a guest operating system (OS) 220 and drivers 224 as needed for the various virtual devices 270.

Note that a single VM may be configured with more than one virtualized processor. To permit computer systems to scale to larger numbers of concurrent threads, systems with multiple CPUs have been developed. These symmetric multi-processor (SMP) systems are available as extensions of the PC platform and from other vendors. Essentially, an SMP system is a hardware platform that connects multiple processors to a shared main memory and shared I/O devices. Virtual machines may also be configured as SMP VMs. FIG. 1, for example, illustrates multiple virtual processors 210-0, 210-1, ..., 210-$m$ (VCPU0, VCPU1, ..., VCPUm) within the VM 200.

Yet another configuration is found in a so-called "multi-core" architecture, in which more than one physical CPU is fabricated on a single chip, with its own set of functional units (such as a floating-point unit and an arithmetic/logic unit ALU), and can execute threads independently; multi-core processors typically share only very limited resources, such as some cache. Still another technique that provides for simultaneous execution of multiple threads is referred to as "simultaneous multi-threading," in which more than one logical CPU (hardware thread) operates simultaneously on a single chip, but in which the logical CPUs flexibly share some resource such as caches, buffers, functional units, etc. This invention may be used regardless of the type—physical and/or logical—or number of processors included in a VM.

If the VM 200 is properly designed, applications 260 running on the VM will function as they would if run on a "real" computer, even though the applications are running at least partially indirectly, that is via the guest OS 220 and virtual processor(s). Executable files will be accessed by the guest OS from the virtual disk 240 or virtual memory 230, which will be portions of the actual physical disk 140 or memory 130 allocated to that VM. Once an application is installed within the VM, the guest OS retrieves files from the virtual disk just as if the files had been pre-stored as the result of a conventional installation of the application. The design and operation of virtual machines are well known in the field of computer science.

Some interface is generally required between the guest software within a VM and the various hardware components and devices in the underlying hardware platform. This interface—which may be referred to generally as "virtualization software"—may include one or more software components and/or layers, possibly including one or more of the software components known in the field of virtual machine technology as "virtual machine monitors" (VMMs), "hypervisors," or virtualization "kernels." Because virtualization terminology has evolved over time and has not yet become fully standardized, these terms do not always provide clear distinctions between the software layers and components to which they refer. For example, "hypervisor" is often used to describe both a VMM and a kernel together, either as separate but cooperating components or with one or more VMMs incorporated wholly or partially into the kernel itself; however, "hypervisor" is sometimes used instead to mean some variant of a VMM alone, which interfaces with some other software layer(s) or component(s) to support the virtualization. Moreover, in some systems, some virtualization code is included in at least one "superior" VM to facilitate the operations of other VMs. Furthermore, specific software support for VMs may be included in the host OS itself. Unless otherwise indicated, the invention described below may be used in virtualized computer systems having any type or configuration of virtualization software.

Moreover, FIG. 1 shows virtual machine monitors that appear as separate entities from other components of the virtualization software. Furthermore, some software components used to implement one illustrated embodiment of the invention are shown and described as being within a "virtualization layer" located logically between all virtual machines and the underlying hardware platform and/or system-level host software. This virtualization layer can be considered part of the overall virtualization software, although it would be possible to implement at least part of this layer in specialized hardware. The illustrated embodiments are given only for the sake of simplicity and clarity and by way of illustration—as mentioned above, the distinctions are not always so clear-cut. Again, unless otherwise indicated or apparent from the description, it is to be assumed that the invention can be implemented anywhere within the overall structure of the virtualization software, and even in systems that provide specific hardware support for virtualization.

The various virtualized hardware components in the VM, such as the virtual CPU(s) 210-0, 210-1, . . . , 210-*m*, the virtual memory 230, the virtual disk 240, and the virtual device(s) 270, are shown as being part of the VM 200 for the sake of conceptual simplicity. In actuality, these "components" are usually implemented as software emulations 330 included in the VMM. One advantage of such an arrangement is that the VMM may (but need not) be set up to expose "generic" devices, which facilitate VM migration and hardware platform-independence.

Different systems may implement virtualization to different degrees—"virtualization" generally relates to a spectrum of definitions rather than to a bright line, and often reflects a design choice with respect to a trade-off between speed and efficiency on the one hand and isolation and universality on the other hand. For example, "full virtualization" is sometimes used to denote a system in which no software components of any form are included in the guest other than those that would be found in a non-virtualized computer; thus, the guest OS could be an off-the-shelf, commercially available OS with no components included specifically to support use in a virtualized environment.

In contrast, another concept, which has yet to achieve a universally accepted definition, is that of "para-virtualization." As the name implies, a "para-virtualized" system is not "fully" virtualized, but rather the guest is configured in some way to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software.

For some, para-virtualization implies that the guest OS (in particular, its kernel) is specifically designed to support such an interface. According to this view, having, for example, an off-the-shelf version of Microsoft Windows XP™ as the guest OS would not be consistent with the notion of para-virtualization. Others define para-virtualization more broadly to include any guest OS with any code that is specifically intended to provide information directly to any other component of the virtualization software. According to this view, loading a module such as a driver designed to communicate with other virtualization components renders the system para-virtualized, even if the guest OS as such is an off-the-shelf, commercially available OS not specifically designed to support a virtualized computer system. Unless otherwise indicated or apparent, this invention is not restricted to use in systems with any particular "degree" of virtualization and is not to be limited to any particular notion of full or partial ("para-") virtualization.

In addition to the sometimes fuzzy distinction between full and partial (para-) virtualization, two arrangements of intermediate system-level software layer(s) are in general use—a "hosted" configuration and a non-hosted configuration (which is shown in FIG. 1). In a hosted virtualized computer system, an existing, general-purpose operating system forms a "host" OS that is used to perform certain input/output (I/O) operations, alongside and sometimes at the request of the VMM. The Workstation product of VMware, Inc., of Palo Alto, Calif., is an example of a hosted, virtualized computer system, which is also explained in U.S. Pat. No. 6,496,847 (Bugnion, et al., "System and Method for Virtualizing Computer Systems," 17 Dec. 2002).

As illustrated in FIG. 1, in many cases, it may be beneficial to deploy VMMs on top of a software layer—a kernel 600—constructed specifically to provide efficient support for the VMs. This configuration is frequently referred to as being "non-hosted." Compared with a system in which VMMs run directly on the hardware platform, use of a kernel offers greater modularity and facilitates provision of services (for example, resource management) that extend across multiple virtual machines. Compared with a hosted deployment, a kernel may offer greater performance because it can be co-developed with the VMM and be optimized for the characteristics of a workload consisting primarily of VMs/VMMs. The kernel 600 also handles any other applications running on it that can be separately scheduled, as well as a console operating system that, in some architectures, is used to boot the system and facilitate certain user interactions with the virtualization software.

Note that the kernel 600 is not the same as the kernel that will be within the guest OS 220—as is well known, every operating system has its own kernel. Note also that the kernel 600 is part of the "host" platform of the VM/VMM as defined above even though the configuration shown in FIG. 1 is commonly termed "non-hosted;" moreover, the kernel may be both part of the host and part of the virtualization software or "hypervisor." The difference in terminology is one of perspective and definitions that are still evolving in the art of virtualization.

Figure 2:
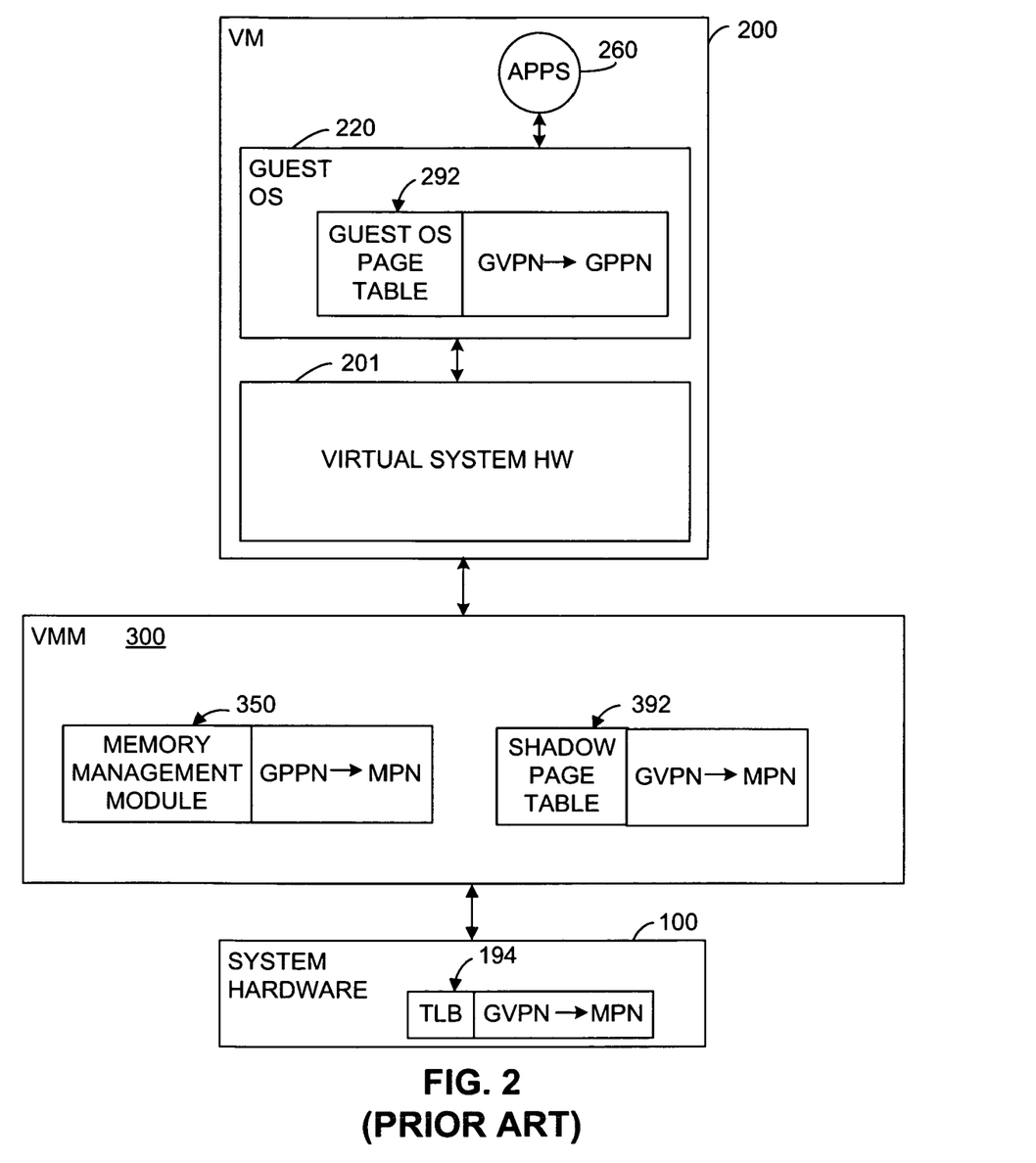
FIG. 2 illustrates virtual memory management and address mapping functions performed by the virtual machine monitor and other various components of the virtualized computer system.

FIG. 2 illustrates virtual memory management and address mapping functions performed by the VMM 300 and other various components of the virtualized computer system. The guest OS 220 generates a guest OS page table 292. The guest OS page table 292 contains mappings from GVPNs (Guest Virtual Page Numbers) to GPPNs (Guest Physical Page Numbers). Suppose that a guest application 260 attempts to access a memory location having a first GVPN, and that the guest OS 220 has specified in the guest OS page table 292 that the first GVPN is backed by what it believes to be a physical memory page having a first GPPN. The mapping from the first GVPN to the first GPPN is used by the virtual system hardware 201. The memory management module 350 translates the first GPPN into a corresponding MPN (Machine Page Number), say a first MPN, using a so-called BusMem/PhysMem table including mappings from guest physical addresses to bus addresses and then to machine address. The memory management module 350 creates a shadow page table 392, and inserts a translation into the shadow page table 392 mapping the first GVPN to the first MPN. In other words, the memory management module 350 creates shadow page tables 392 containing the mapping from the GVPN to the MPN. This mapping from the first GVPN to the first MPN is used by the system hardware 100 to access the actual hardware memory that is backing up the GVPN, and is also loaded into the TLB (Translation Look-Aside Buffer) 194 to cache the GVPN to MPN mapping for future memory access.

Note that the terms "guest virtual page number (GVPN)" and "guest virtual page" are used synonymously herein with the terms "virtual page number" and "virtual page," respectively, and with the terms "linear page number" and "linear page," respectively. Also note that the term "guest physical page number" and "guest physical page" are used synonymously herein with the terms "virtual physical page number" and "virtual physical page," respectively, because they are not real physical page numbers but what the virtual machine 200 believes to be the physical page numbers. Finally, note that the base address of a page is computed by multiplying the page number of the page by the size of the page.

Figure 3:
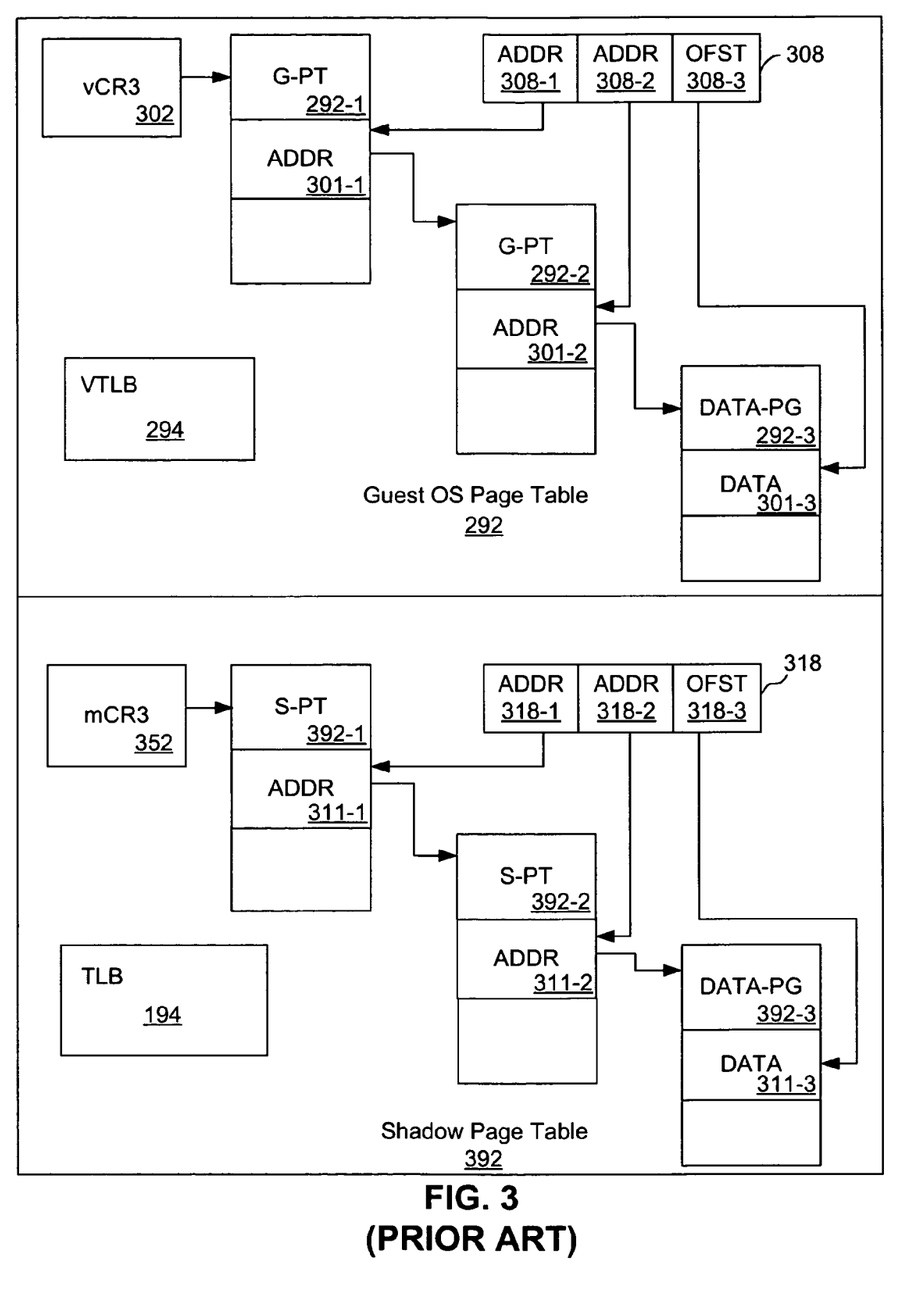
FIG. 3 illustrates the structure of the guest O/S page table and the shadow page table in a virtualized computer system in more detail.

FIG. 3 illustrates the structure of the guest O/S page table 292 and the shadow page table 392 in a virtualized computer system in more detail. The guest O/S page tables 292 include a plurality of tables (G-PT) 292-1, 292-2 each of which includes entries 301-1, 301-2 with page numbers of other guest page tables or a data page. A data page (DATA-PG) 292-3 includes data 301-3 at a guest physical address corresponding to a guest virtual address. vCR3 302 is a virtual page directory base pointer that points to the root guest page table 292-1.

In order to find the guest physical address corresponding to a guest virtual address 308 including a plurality of address fields (ADDR) 308-1, 308-2 and an offset (OFST) field 308-3, a page walk on the guest O/S page table 292 is performed by walking through the guest page tables 292-1, 292-2. Specifically, the root guest page table 292-1 is accessed using the address pointed to by vCR3 302. The first address field 308-1 is an index into entry 301-1 of the root guest page table 292-1. The entry 301-1 includes a physical page number of the next guest page table 292-2, and the next address field 308-2 is an index into entry 301-2 of the guest page table 292-2. The entry 301-2 includes a physical page number of the data page 292-3. The physical address pointing to the data 301-3 corresponding to the virtual address 308 is the base address of the data page 292-3 plus the offset field 308-3. In general, a page walk on the guest O/S page tables 292 presents a significant computational burden on the virtualized computer system.

The structure of the shadow page table 392 mimics that of the guest O/S page table 292. The shadow page table 392 also includes a plurality of tables (S-PT) 392-1, 392-2 each of which includes entries 311-1, 311-2 with page numbers of other tables (S-PT) or a data page 392-3. A data page 392-3 includes data 311-3 at a machine address corresponding to a guest virtual address. mCR3 352 is a machine page directory base pointer that points to the root table (S-PT) 392-1.

In order to find the machine address corresponding to a guest virtual address 318 including a plurality of address fields (ADDR) 318-1, 318-2 and the offset (OFST) field 318-3, the CPU 110 performs a page walk on the shadow page tables 392 by walking through the shadow page tables 392-1, 392-2. Specifically, the root shadow page table 392-1 is accessed using the address pointed to by mCR3 352. The first address field 318-1 is an index into entry 311-1 of the root shadow page table 392-1. The entry 311-1 includes a machine page number of the next shadow page table 392-2, and the next address field 318-2 is an index into entry 311-2 of the shadow page table 392-2. The entry 311-2 includes a machine page number of the data page 392-3. The machine address pointing to the data 311-3 corresponding to the virtual address 318 is the base address of the data page 392-3 plus the offset field 318-3.

Figure 4:
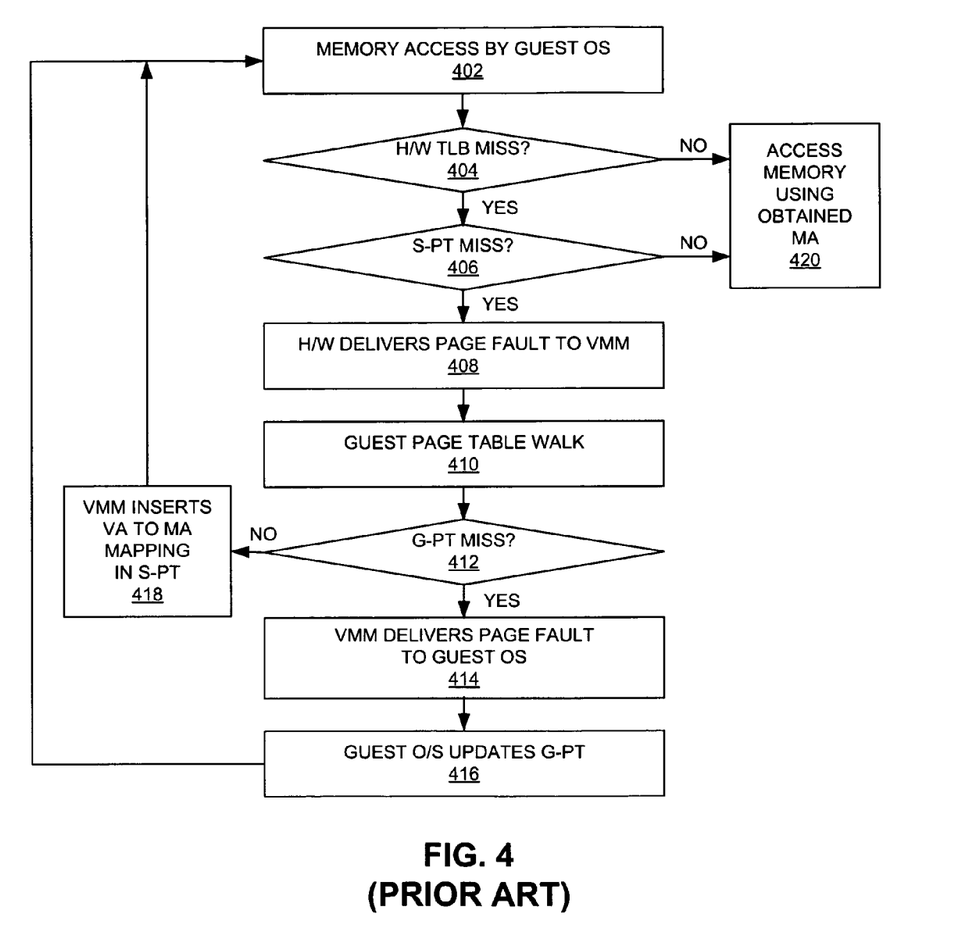
FIG. 4 is a flowchart illustrating a conventional process for virtual memory access in a virtualized computer system.

FIG. 4 is a flowchart illustrating a conventional process for virtual memory access in a virtualized computer system. Referring to FIG. 4, when the guest O/S 220 attempts a memory access 402 using a guest virtual address, the system hardware 100 first searches the translation look-aside buffer 194 for the mapping of the guest virtual address to the corresponding machine address and determines whether there is a hardware TLB miss 404. If the corresponding machine address is found, there is no hardware TLB miss 404, and the memory is accessed 420 using the machine address (MA) obtained from the TLB 194. If the corresponding machine address is not found, there is a hardware TLB miss 404, and the system hardware 100 then searches the shadow page table 392 for the mapping of the guest virtual address to the corresponding machine address and determines whether there is a shadow page table (S-PT) miss 406. If the corresponding machine address is found, there is no shadow page table miss 406, and the memory is accessed 420 using the machine address obtained from the shadow page table 392. If the corresponding machine address is not found, there is a shadow page table miss 406, and the system hardware 100 delivers a hardware page fault 408 to the VMM 300, indicating that the corresponding machine page cannot be found in the hardware TLB 194 or the shadow page table 392.

In the conventional process of virtual memory access in a virtualized computer system, the VMM 300 performs a page walk 410 on the guest O/S page table 292 and determines whether the guest virtual address that caused the hardware page fault 408 has a corresponding mapping to a guest physical address in the guest O/S page table 292. If there is a corresponding guest physical address in the guest O/S page table 292, there is no guest page table (G-PT) miss 412. This type of hardware page fault 408 is referred to herein as a "hidden page fault," because the guest O/S page table 292 does have the mapping to a corresponding guest physical address for the guest virtual address but the corresponding guest virtual address to machine address mapping has not been added to the shadow page table 392 yet. In a hidden page fault, the VMM 300 uses the found guest physical address to determine the corresponding machine address using its BusMem/PhysMem tables and inserts 418 the guest virtual address to machine address mapping in the shadow page table 392. As a result, during the next memory access 402 to re-execute the instruction accessing the memory, there will still be a hardware TLB miss 404 but there will not be a shadow page table miss 406, and the memory can be accessed 420 using the corresponding machine address. In addition, the guest virtual address to machine address mapping can also be cached in the hardware TLB 194 for future use.

However, if there is no corresponding guest physical address in the guest O/S page table 292, this means there is a guest page table (G-PT) miss 412. This type of hardware page fault 408 is referred to herein as a "true page fault," because even the guest O/S page tables 292 do not contain the mapping to a corresponding guest physical address for the guest virtual address. In a true page fault, the VMM 300 delivers a page fault 414 to the guest O/S 220, and the guest O/S 220 creates an appropriate mapping from the guest virtual address to a guest physical address and updates 416 the guest O/S page table 292 using the created mapping. During the next memory access 402 using the guest virtual address to re-execute the instruction accessing the memory, there will still be a hardware TLB miss 404, a shadow page table miss 406, and a hardware page fault 408. However, the corresponding guest physical address will be found during the guest page table walk 410, and thus there will be no guest page table miss 412. The VMM 300 will now be able to insert 418 the guest virtual address to machine address mapping in the shadow page table 392. Therefore, during a subsequent memory access 402 to re-execute the instruction accessing the memory, the memory can be accessed 420 using the corresponding machine address found in the shadow page table 392 (see step 406), as explained above.

Note that, in the case of a true page fault, the VMM 300 unnecessarily performs the guest page table walk 410 only to find that the guest virtual address to guest physical address mapping is not present in the guest O/S page table 292 (i.e., guest page table miss 412). Such unnecessary guest page table walks 410 present a significant computational burden on the virtualized computer system.

Therefore, there is a need for a technique for obviating the guest page table walk in a true page fault where the guest virtual address to guest physical address mapping corresponding to a shadow page table entry is not present in the guest O/S page table.

SUMMARY OF THE INVENTION

A method and system are provided that do not perform an address translation look-up or a page walk on the guest page tables if the shadow page table entry corresponding to the guest virtual address for accessing the virtual memory indicates that a valid, corresponding mapping from the guest virtual address to a guest physical address is absent in the guest page tables. Markers or indicators are stored in the shadow page table entries to indicate that a guest virtual address to guest physical address mapping corresponding to the guest virtual address of the shadow page table entry is not present in the guest page table.

In one aspect of the present invention, when a hardware page fault is issued indicating that the translation look-aside buffers and the shadow page tables do not include a valid machine address mapping corresponding to the virtual address used for accessing the virtual memory, it is determined whether an indicator of a shadow page table entry corresponding to the guest virtual address is in a first state or a second state. If the indicator is in the first state, an address translation look-up or a page walk is performed on the guest page tables to determine a guest physical address corresponding to the virtual address. If the indicator is in the second state, a page fault is issued, indicating that the guest page tables do not include the guest physical address corresponding to the virtual address, without performing the address translation look-up or the page walk on the guest page tables. The indicator may be a predetermined portion, such as a reserved portion, of the shadow page table entry. Because the guest page walk or the address translation lookup is skipped in a true page fault, the virtual memory access according to the present invention is faster, optimized, and presents significantly less computational burden to the virtualized computer system.

In another aspect of the present invention, the shadow page tables are managed to maintain the indicator. When a guest page table entry that cannot be used to translate a guest virtual address to a guest physical address is detected, the indicator of the corresponding shadow page table entry for the virtual address is set to a first state. Detecting such guest page table entry may be performed by scanning a subset of entries of the guest page tables to determine whether the entries have valid mappings in the guest page table. Detecting the guest page table entry may also be performed by detecting a change from a state where the guest page table entry has a corresponding valid mapping in the guest page tables to another state where the guest page table entry does not have the corresponding valid mapping in the guest page tables. By maintaining the indicators of the shadow page table entries in this manner, it is possible to use the indicator to determine whether a guest page walk or address translation look-up can be skipped when a hardware page fault occurs.

The present invention as described herein may be used to advantage in both a hosted and a non-hosted virtualized computer system, regardless of the degree of virtualization, in which the virtual machine(s) have any number of physical and/or logical virtualized processors. Moreover, the invention may even be implemented wholly or partially in hardware, for example in processor architectures intended to provide hardware support for virtual machines.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teaching of the present invention can be readily understood by considering the following detailed description in conjunction with the accompanying drawings.

DETAILED DESCRIPTION OF EMBODIMENTS

The Figures (FIG.) and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 5:
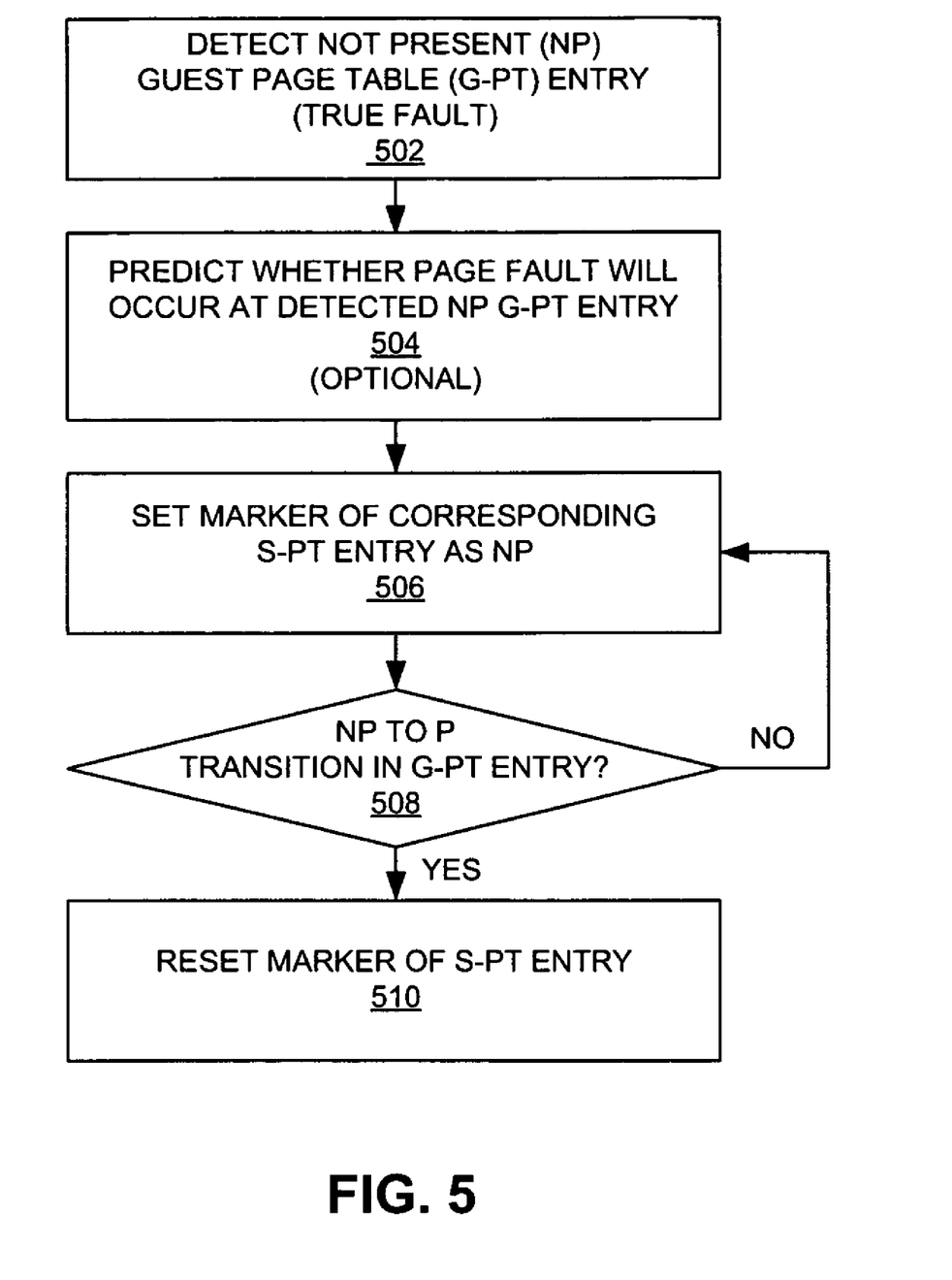
FIG. 5 is a flowchart illustrating a process of setting and maintaining a marker in a shadow page table entry indicating that a corresponding mapping is not present in the guest O/S page table, according to one embodiment of the present invention.

FIG. 5 is a flowchart illustrating a process of setting and maintaining a marker (indicator) in a shadow page table entry indicating that a corresponding mapping is not present in the guest O/S page table, according to one embodiment of the present invention. In the process of FIG. 5, the VMM 300 sets a marker in the shadow page table entry when it is determined that the guest page table entry corresponding to the shadow page table entry does not have a valid mapping in the guest O/S page table 292. Specifically, when the VMM 300 detects 502 a guest page table entry that cannot be used to translate a guest virtual address (page) to guest physical address (data page) (hereinafter referred to as "not present G-PT entry"), the VMM 300 sets 506 a marker (indicator) of the corresponding shadow page table entry for the guest virtual address to indicate a true page fault for that shadow page table entry. In one embodiment, the process of FIG. 5 may optionally predict 504 whether a page fault will likely occur at the not-present G-PT entry detected in step 502 and only set the marker of the shadow page table entry to indicate the true page fault only if the page fault is likely to occur. For example, the predictions can be based upon heuristics, i.e., by collecting historical information on guest virtual addresses that triggered a certain number of page faults in the past. This is to save the processing time of setting the markers in the shadow page table entries if a page fault is unlikely to occur at the detected not-present G-PT entry.

In one embodiment, the VMM 300 detects the not-present G-PT entry by scanning a subset of the guest page table entries. For example, a subset of the guest page table entries near where a page fault had occurred can be scanned, because page faults tend to be localized. If guest virtual address to guest physical address mappings are not present in the guest O/S page table 220 for those guest page table entries, then those guest page table entries are determined to be not-present G-PT entries and the markers of the corresponding shadow page table entries for those guest virtual addresses are set 506 to indicate a true page fault. Which subset of the guest page table entries is to be scanned can be determined using heuristics indicating which of the guest page table entries are likely to be not-present G-PT entries and thus are worth scanning in the guest O/S page table 220. For example, the predictions can be based upon heuristics, i.e., by collecting historical information on guest virtual addresses that triggered a certain number of page faults in the past. Note that scanning subsets of the guest page table entries is less burdensome than performing a page walk on the guest page tables because nearby guest page table entries can be scanned without significant cost when the page walk is performed on the guest page tables 292 to create the shadow page table entries anyway.

In another embodiment, the memory management module 350 detects the not-present G-PT entry when it detects the transition of a guest page table entry that previously had a valid guest virtual address to guest physical address mapping in the guest O/S page table 292 ("present G-PT entry") subsequently to a not-present G-PT entry. Such transition from a present G-PT entry to a not-present G-PT entry can be detected by, for example, using a trace applied to the guest O/S page table 292. Traces for the guest O/S page table 292 are typically applied by setting the corresponding shadow page table entry read-only. When a guest page table entry is updated in certain instances to invalidate the guest virtual address to guest physical address mapping in the guest O/S page table 292, the markers in the corresponding shadow page table entry should reflect the update. By virtue of the traces, an update on the read-only entries in the guest O/S page table 292 causes the VMM 300 to detect the update and reflect that change in the corresponding shadow page table entries.

Figure 7:
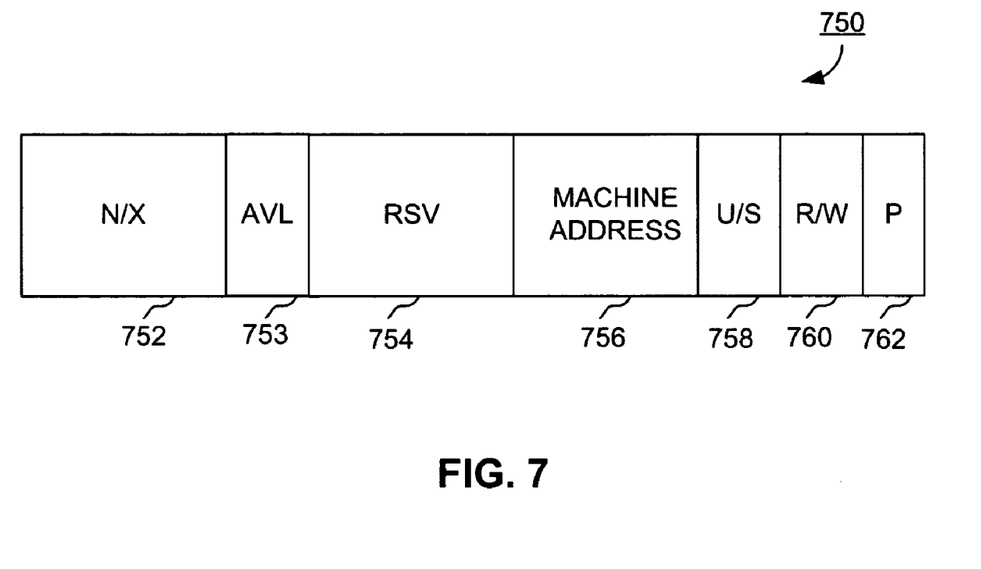
FIG. 7 illustrates an entry in the shadow page table, according to one embodiment of the present invention.

The marker in the shadow page table entry indicating a not-present G-PT entry can be set using certain bits of the shadow page table entry. FIG. 7 illustrates an entry in the shadow page table, according to one embodiment of the present invention. As an illustrative example, the shadow page table entry 750 of FIG. 7 is implemented in an Intel x86 type processor. The shadow page table entry 750 comprises N/X (No Execute) bits 752, AVL (available) bits 753, RSV (reserve) bits 754, machine address bits 756, a U/S (user/supervisor) bit 758, an R/W (read/write) bit 760, and a P (present) bit 762.

In one embodiment, the reserved bits 754 are set to indicate the not-present G-PT entry. Note that the present bit 762 is also set to indicate that the shadow page table entry is a valid entry; however merely having the present bit 762 set does not indicate one way or the other whether the corresponding guest page table entry has a valid guest virtual address to guest physical address mapping. By setting the reserved bit 754 in addition to setting the present bit 762, it is possible to indicate the not-present G-PT entry and thus no page walk on the guest O/S page tables 292 is necessary. Conventionally, the reserved bits 754 were not used, so they can be used as the special marker indicating the not-present G-PT entry. Access to the shadow page table entry 750 with the reserved bit 754 set causes a page fault with an error code indicating that the reserved bit 754 of the shadow page table entry is set, i.e., a true page fault.

In another embodiment, the VMM 300 sets one of the bits in the shadow page table entry 750 conventionally used to prevent execution of a page (the NX-bit 752) to indicate the not-present G-PT entry if the virtualized computer system is not using this NX-bit 752. When an attempt is made to execute an instruction that lies on such a page, a page fault is generated. Since the NX bit is not used for any other purpose other than indicating a not-present G-PT entry, it is possible to determine that only the not-present G-PT entry could have triggered the page fault.

In still another embodiment, the available bits 753 are set to indicate a not-present G-PT entry. When the available bits 753 are used to indicate the not-present G-PT entry, the VMM 300 cannot recognize the not-present G-PT entry based on the error code 850 itself, because the error code 850 does not include the available bits 753. Rather, the VMM 300 will have to inspect the shadow page table entry 750 to determine whether the available bits 753 are set.

Figure 8:
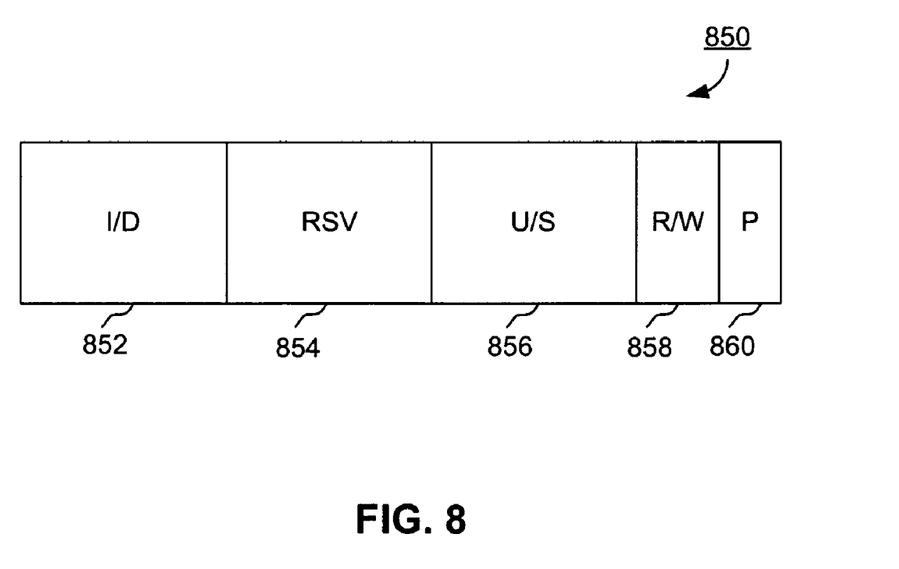
FIG. 8 illustrates a hardware page fault error code, according to one embodiment of the present invention.

FIG. 8 illustrates a hardware page fault error code 850, according to one embodiment of the present invention. The hardware page fault error code 850 is the error code delivered to the VMM 300 when a hardware page fault occurs (see step 408). The hardware page fault error code 850 is similar to the shadow page table entry 750, and comprises an identification (I/D) 852 of the corresponding shadow page table entry, RSV (reserve bits) 854, U/S (user/supervisor) bit 856, a R/W (read/write) bit 858, and a P (present) bit 860. If the reserved bits 754 are used in the shadow page table entry 750 to indicate a not-present G-PT entry, the reserved bits 854 of the error code 850 are likewise used to indicate to the VMM a not-present G-PT entry together with the hardware page fault.

Referring back to FIG. 5, the process also determines 508 whether a not-present G-PT entry (NP) transitions to a present G-PT entry. Such transition can occur, for example, when the guest O/S 220 adds a guest virtual address to guest physical address mapping in the guest O/S page table 292 (see, e.g., step 416 of FIG. 4). If such transition occurs, the marker of the corresponding shadow page table entry is reset 510 to now indicate a present G-PT entry. If no transition occurs, the marker of the corresponding shadow page table entry is maintained set 506 to indicate a not-present G-PT entry.

Figure 6:
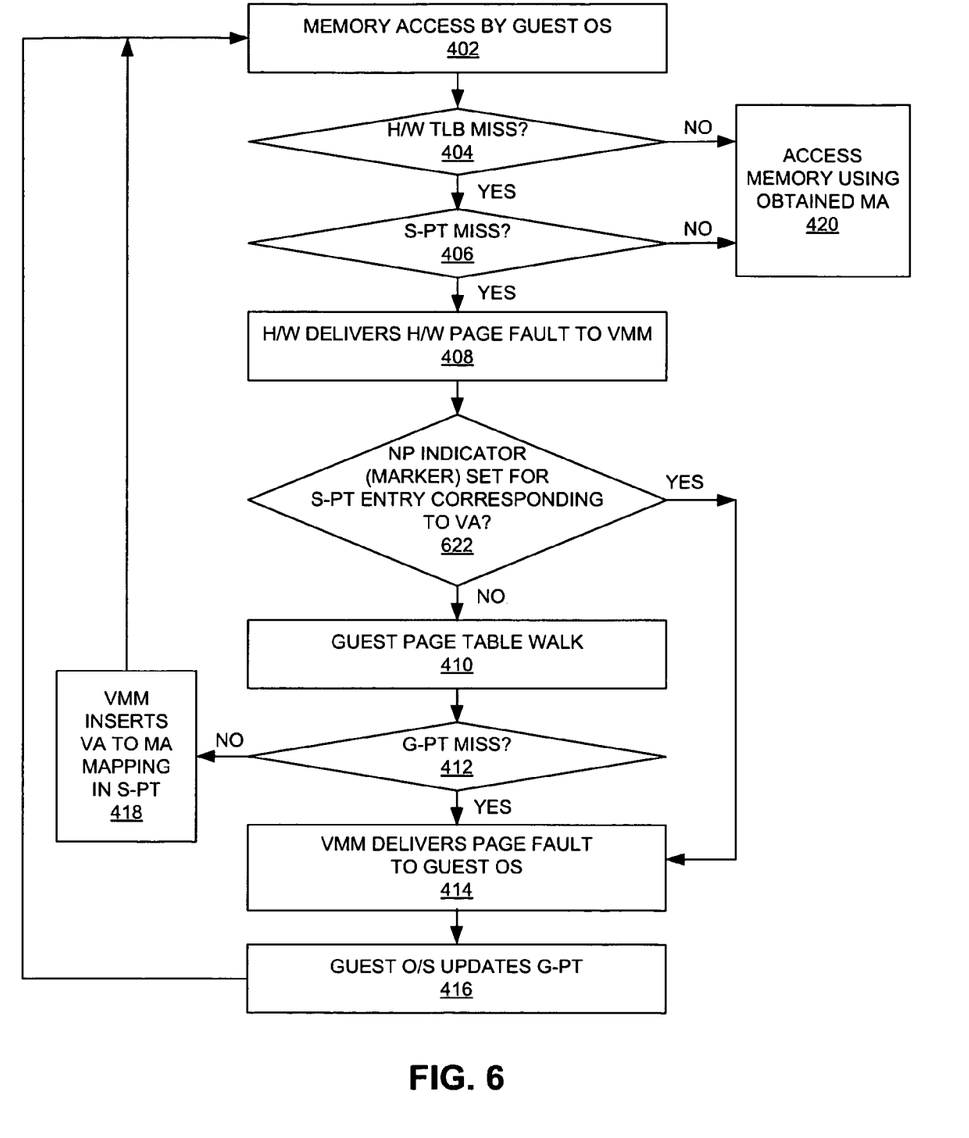
FIG. 6 is a flowchart illustrating a process for virtual memory access in a virtualized computer system, according to one embodiment of the present invention.

FIG. 6 is a flowchart illustrating a process for virtual memory access in a virtualized computer system, according to one embodiment of the present invention. Referring to FIG. 6, when the guest O/S 220 attempts a memory access 402 using a guest virtual address, the system hardware 100 first searches the translation look-aside buffer 194 for the mapping of the guest virtual address to the corresponding machine address and determines whether there is a hardware TLB miss 404. If the corresponding machine address is found, there is no hardware TLB miss 404, and the memory is accessed 420 using the machine address (MA) obtained from the TLB 194. If the corresponding machine address is not found, there is a hardware TLB miss 404, and the system hardware 100 further searches the shadow page table 392 for the mapping of the guest virtual address to the corresponding machine address and determines whether there is a shadow page table (S-PT) miss 406. If the corresponding machine address is found, there is no shadow page table miss 406, and the memory is accessed 420 using the machine address obtained from the shadow page table 392.

If the corresponding machine address is not found, there is a shadow page table miss 406 and the system hardware delivers a hardware page fault 408 to the VMM 300. Then, the VMM 300 determines 622 whether a marker (indicator) (i.e., the reserved bit 754 or the N/X bit 752) is set in the shadow page table entry corresponding to the guest virtual address to indicate a not-present G-PT entry, and as a result, the guest O/S 220 receives an error code 850 that indicates the not-present G-PT entry.

If the NP marker is not set, the VMM 300 performs a page walk 410 on the guest O/S page table 292 and determines whether the guest virtual address that caused the hardware page fault 408 has a corresponding mapping to a guest physical address in the guest O/S page table 292. If there is a corresponding guest physical address in the guest O/S page table 292, there is no guest page table (G-PT) miss 412 (hidden page fault). In a hidden page fault, the VMM 300 uses the found guest physical address to determine the corresponding machine address using its BusMem/PhysMem tables and inserts 418 the guest virtual address to machine address mapping in the shadow page table 392. As a result, during the next memory access 402 to re-execute the instruction accessing the memory, there will still be a hardware TLB miss 404 but there will not be a shadow page table miss 406, and the memory can be accessed 420 using the corresponding machine address. In addition, the guest virtual address to machine address mapping can also be cached in the hardware TLB 194 for future use.

However, if the NP marker is set 622, or if a guest page table walk 410 results in a guest page table (G-PT) miss 412, this means the hardware page fault is a true page fault where even the guest O/S page table 292 cannot be used to translate the guest virtual address to the guest physical address. In a true page fault, the VMM 300 delivers 414 a page fault to the guest O/S 220. In the case of a true page fault with the NP marker being set, the page fault is delivered to the guest O/S 220 without going through the guest page table walk 410. In response to the page fault, the guest O/S 220 creates an appropriate mapping from the guest virtual address to a corresponding guest physical address and updates 416 the guest O/S page table 292 using the created mapping. This will also cause the marker in the corresponding shadow page table entry to be reset, as explained above with reference to steps 508 and 510 of FIG. 5. Because the VMM 300 is able to skip the guest page walk in a true page fault, when the corresponding NP marker is set, the virtual memory access according to the present invention is faster, optimized, and presents significantly less computational burden to the virtualized computer system.

During the next memory access 402 using the guest virtual address to re-execute the instruction accessing the memory, there will still be a hardware TLB miss 404, a shadow page table miss 406, and a hardware page fault 408. In addition, since the marker of the corresponding shadow page table entry was reset (step 510 of FIG. 5), a guest page table walk 410 is performed, and the corresponding guest physical address will be found during the guest page table walk 410. Thus, there will be no guest page table miss 412. The VMM 300 will now be able to insert 418 the guest virtual address to machine address mapping in the shadow page table 392. Therefore, during the subsequent memory access 402 to re-execute the instruction accessing the memory, the memory can be accessed 420 using the corresponding machine address found in the shadow page table 392 (see step 406), as explained above.

The methods described in FIGS. 5 and 6 can be performed in the virtualization software component such as the VMM 300 or the kernel 600, as a computer program product stored in a computer readable medium such as the disk 140 or memory 130 in the system hardware 100. The methods described in FIGS. 5 and 6 can also be implemented partially or entirely in the form of hardware devices, for example, as firmware for the CPUs 110. As such, the present invention is not limited to a particular form or location of the software.

Upon reading this disclosure, those of skill in the art will appreciate still additional alternative embodiments for virtual memory access through the disclosed principles of the present invention. For example, the NP G-PT entry can be indicated by other bits in the shadow page table entry or any other data structure, so long as it does not interfere with the proper operation of the virtualized computer system. For another example, the NP G-PT entry may be detected in a manner and timing different from those described herein.

Thus, while particular embodiments and applications of the present invention have been illustrated and described, it is to be understood that the invention is not limited to the precise construction and components disclosed herein. Various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. For a virtual memory of a virtualized computer system in which guest page tables map virtual addresses to guest physical addresses which are backed by machine addresses, and shadow page tables and a translation look-aside buffer map the virtual addresses to the corresponding machine addresses, a computer-implemented method of accessing the virtual memory using a virtual address, the method comprising:
   determining whether an indicator of a shadow page table entry corresponding to the virtual address is in a first state or a second state, the indicator indicating whether the guest page tables contain a valid address translation for the virtual address, this indication being distinct from an indication as to whether the shadow page tables contain a valid address translation for the virtual address, so that a shadow page table entry may indicate that the shadow page tables do not contain a valid address translation for the virtual address while indicating that the guest page tables do contain a valid address translation for the virtual address;
   responsive to the indicator being in the first state, performing an address translation look-up in the guest page tables to determine a guest physical address corresponding to the virtual address, using the guest physical address to determine a corresponding machine address, and inserting into the shadow page tables a mapping from the virtual address to the corresponding machine address; and
   responsive to the indicator being in the second state, delivering a page fault indication to guest system software, without performing the address translation look-up in the guest page tables.

2. The method of claim 1, wherein the step of determining whether an indicator in a shadow page table entry corresponding to the virtual address is in a first state or a second state is performed responsive to a hardware page fault indicating that the translation look-aside buffer and the shadow page tables do not include a machine address mapping corresponding to the virtual address.

3. The method of claim 1, further comprising generating an error code indicative of the indicator of the shadow page table entry being in the first state or the second state.

4. The method of claim 1, wherein the indicator is a predetermined portion of the shadow page table entry.

5. The method of claim 1, wherein the indicator is a reserved portion of the shadow page table entry or a portion of the shadow page table entry indicating no-execution.

6. For a virtual memory of a virtualized computer system in which guest page tables map virtual addresses to guest physical addresses which are backed by machine addresses, and shadow page tables and a translation look-aside buffer map the virtual addresses to the corresponding machine addresses, a computer program product stored on a non-transitory computer readable medium and configured to perform a computer-implemented method of accessing the virtual memory using a virtual address, the method comprising:
   determining whether an indicator of a shadow page table entry corresponding to the virtual address is in a first state or a second state, the indicator indicating whether the guest page tables contain a valid address translation for the virtual address, this indication being distinct from an indication as to whether the shadow page tables contain a valid address translation for the virtual address, so that a shadow page table entry may indicate that the shadow page tables do not contain a valid address translation for the virtual address while indicating that the guest page tables do contain a valid address translation for the virtual address;
   responsive to the indicator being in the first state, performing an address translation look-up in the guest page tables to determine a guest physical address corresponding to the virtual address, using the guest physical address to determine a corresponding machine address, and inserting into the shadow page tables a mapping from the virtual address to the corresponding machine address; and
   responsive to the indicator being in the second state, delivering a page fault indication to guest system software, without performing the address translation look-up in the guest page tables.

7. The computer program product of claim 6, wherein the step of determining whether an indicator in a shadow page table entry corresponding to the virtual address is in a first state or a second state is performed responsive to a hardware page fault indicating that the translation look-aside buffer and the shadow page tables do not include a valid machine address mapping corresponding to the virtual address.

8. The computer program product of claim 6, wherein the method further comprises generating an error code indicative of the indicator of the shadow page table entry being in the first state or the second state.

9. The computer program product of claim 6, wherein the indicator is a predetermined portion of the shadow page table entry.

10. The computer program product of claim 8, wherein the indicator is a reserved portion of the shadow page table entry or a portion of the shadow page table entry indicating no-execution.

11. A virtualized computer system running on a host computer, including virtual memory wherein guest page tables map virtual addresses to guest physical addresses which are backed by machine addresses, and shadow page tables and a translation look-aside buffer map the virtual addresses to the corresponding machine addresses, the virtualized computer system including a storage device storing computer instructions configured to perform a computer-implemented method of accessing the virtual memory using a virtual address, and one or more central processing units for executing the computer instructions, the method comprising:
   determining whether an indicator of a shadow page table entry corresponding to the virtual address is in a first state or a second state, the indicator indicating whether the guest page tables contain a valid address translation for the virtual address, this indication being distinct from an indication as to whether the shadow page tables contain a valid address translation for the virtual address, so that a shadow page table entry may indicate that the shadow page tables do not contain a valid address translation for the virtual address while indicating that the guest page tables do contain a valid address translation for the virtual address;
   responsive to the indicator being in the first state, performing an address translation look-up in the guest page tables to determine a guest physical address corresponding to the virtual address, using the guest physical address to determine a corresponding machine address, and inserting into the shadow page tables a mapping from the virtual address to the corresponding machine address; and
   responsive to the indicator being in the second state, delivering a page fault indication to guest system software, without performing the address translation look-up in the guest page tables.

12. The virtualized computer system of claim 11, wherein the step of determining whether an indicator in a shadow page table entry corresponding to the virtual address is in a first state or a second state is performed responsive to a hardware page fault indicating that the translation look-aside buffer and the shadow page tables do not include a valid machine address mapping corresponding to the virtual address.

13. The virtualized computer system of claim 11, wherein the method further comprises generating an error code indicative of the indicator of the shadow page table entry being in the first state or the second state.

14. The virtualized computer system of claim 11, wherein the indicator is a predetermined portion of the shadow page table entry.

15. The virtualized computer system of claim 11, wherein the indicator is a reserved portion of the shadow page table entry or a portion of the shadow page table entry indicating no-execution.

16. For a virtual memory of a virtualized computer system in which guest page tables map virtual addresses to guest physical addresses which are backed by machine addresses, and shadow page tables and a translation look-aside buffer map the virtual addresses to the corresponding machine addresses, a computer-implemented method of managing the shadow page tables, the method comprising:
   detecting a guest page table entry that cannot be used to translate a guest virtual address to a guest physical address; and
   responsive to detecting the guest page table entry, setting an indicator of a shadow page table entry corresponding to the virtual address to a first state, the indicator indicating whether the guest page tables contain a valid address translation for the virtual address, this indication being distinct from an indication as to whether the shadow page tables contain a valid address translation for the virtual address, so that a shadow page table entry may indicate that the shadow page tables do not contain a valid address translation for the virtual address while indicating that the guest page tables do contain a valid address translation for the virtual address.

17. The method of claim 16, wherein detecting the guest page table entry comprises:
scanning a subset of entries of the guest page tables to determine whether each of the entries have a valid mapping.

18. The method of claim 16, wherein detecting the guest page table entry comprises:
detecting a change from the guest page table entry having a valid mapping to not having the valid mapping.

19. The method of claim 18, wherein the change results from an update to the guest page table entry that was previously designated read-only.

20. The method of claim 16, further comprising:
responsive to detecting a change from the guest page table entry not having a valid mapping to having the valid mapping, setting the indicator of the shadow page table entry to a second state.

21. For a virtual memory of a virtualized computer system in which guest page tables map virtual addresses to guest physical addresses which are backed by machine addresses, and shadow page tables and a translation look-aside buffer map the virtual addresses to the corresponding machine addresses, a computer program product stored on a non-transitory computer readable medium and configured to perform a computer-implemented method of managing the shadow page tables, the method comprising:
detecting a guest page table entry that cannot be used to translate a guest virtual address to a guest physical address; and
responsive to detecting the guest page table entry, setting an indicator of the shadow page table entry corresponding to the virtual address to a first state, the indicator indicating whether the guest page tables contain a valid address translation for the virtual address, this indication being distinct from an indication as to whether the shadow page tables contain a valid address translation for the virtual address, so that a shadow page table entry may indicate that the shadow page tables do not contain a valid address translation for the virtual address while indicating that the guest page tables do contain a valid address translation for the virtual address.

22. The computer program product of claim 21, wherein detecting the guest page table entry comprises:
scanning a subset of entries of the guest page tables to determine whether each of the entries has a valid mapping.

23. The computer program product of claim 21, wherein detecting the guest page table entry comprises:
detecting a change from the guest page table entry having a valid mapping to not having the valid mapping.

24. The computer program product of claim 23, wherein the change results from an update to the guest page table entry that was previously designated read-only.

25. The computer program product of claim 21, wherein the method further comprises:
responsive to detecting a change from the guest page table entry not having a valid mapping to having the valid mapping, setting the indicator of the shadow page table entry to a second state.

26. A virtualized computer system running on a host computer, including virtual memory wherein guest page tables map virtual addresses to guest physical addresses which are backed by machine addresses, and shadow page tables and a translation look-aside buffer map the virtual addresses to the corresponding machine addresses, the virtualized computer system including a storage device storing computer instructions configured to perform a computer-implemented method of managing the shadow page tables, and one or more central processing units for executing the computer instructions, the method comprising:
detecting a guest page table entry that cannot be used to translate a guest virtual address to a guest physical address; and
responsive to detecting the guest page table entry, setting an indicator of the shadow page table entry corresponding to the virtual address to a first state, the indicator indicating whether the guest page tables contain a valid address translation for the virtual address, this indication being distinct from an indication as to whether the shadow page tables contain a valid address translation for the virtual address, so that a shadow page table entry may indicate that the shadow page tables do not contain a valid address translation for the virtual address while indicating that the guest page tables do contain a valid address translation for the virtual address.

27. The virtualized computer system of claim 26, wherein detecting the shadow page table entry comprises:
scanning a subset of entries of the shadow page tables to determine whether each of the entries has the valid mapping.

28. The virtualized computer system of claim 26, wherein detecting the shadow page table entry comprises:
detecting a change from the guest page table entry having a valid mapping to not having the valid mapping.

29. The virtualized computer system of claim 28, wherein the change results from an update to the guest page table entry that was previously designated read-only.

30. The virtualized computer system of claim 26, wherein the method further comprises:
responsive to detecting a change from the guest page table entry not having a valid mapping to having the valid mapping, setting the indicator of the shadow page table entry to a second state.

\* \* \* \* \*